(12) United States Patent
Liu (10) Patent No.: US 8,220,359 B2
(45) Date of Patent: Jul. 17, 2012

(54) THEFTPROOF CLUTCH HANDLE THAT IS DETACHED EASILY AND QUICKLY

(76) Inventor: Yao-Ming Liu, Yongkang (TW)

( * ) Notice: Subject to any disclaimer, the term of this patent is extended or adjusted under 35 U.S.C. 154(b) by 600 days.

(21) Appl. No.: 12/430,292

(22) Filed: Apr. 27, 2009

(65) Prior Publication Data

US 2010/0269622 A1    Oct. 28, 2010

(51) Int. Cl.
*G05G 1/04*    (2006.01)
(52) U.S. Cl. .......................................... 74/523
(58) Field of Classification Search ................ 74/484 R, 74/488, 489, 501.6, 502.2, 519, 523, 524; 70/207, 209; 192/99 S, 114 R, 217; 292/336.3, 292/348, DIG. 27
See application file for complete search history.

(56) References Cited

U.S. PATENT DOCUMENTS

| | | | | |
|---|---|---|---|---|
| 3,478,617 A | * | 11/1969 | Tetsuo | 74/489 |
| 5,910,193 A | * | 6/1999 | Chen | 74/489 |
| 6,047,611 A | * | 4/2000 | Warren et al. | 74/489 |

FOREIGN PATENT DOCUMENTS

| | | | |
|---|---|---|---|
| JP | 2005193877 A | * | 7/2005 |
| JP | 2005349882 A | * | 12/2005 |

* cited by examiner

*Primary Examiner* — Thomas R Hannon
*Assistant Examiner* — Phillip A Johnson
(74) *Attorney, Agent, or Firm* — Alan Kamrath; Kamrath IP Lawfirm, PA (57) ABSTRACT

A theftproof clutch handle for a motorcycle includes a clutch connector provided with a plug, a handle body provided with a slot detachably mounted on the plug, and a locking device mounted on the handle body and releasably locked onto the plug. The handle body has a receiving chamber to receive the locking device. The locking device includes a support seat, a locking shaft, an elastic member and a drive member. Thus, when the drive member is pulled outwardly, the locking shaft is moved outwardly to detach from the locking hole of the plug to unlock the handle body from the clutch connector so that the handle body can be removed from the clutch connector to provide a theftproof effect.

15 Claims, 11 Drawing Sheets

THEFTPROOF CLUTCH HANDLE THAT IS DETACHED EASILY AND QUICKLY

BACKGROUND OF THE INVENTION

1. Field of the Invention

The present invention relates to a clutch handle and, more particularly, to a theftproof clutch handle for a motorcycle.

2. Description of the Related Art

Figure 11:
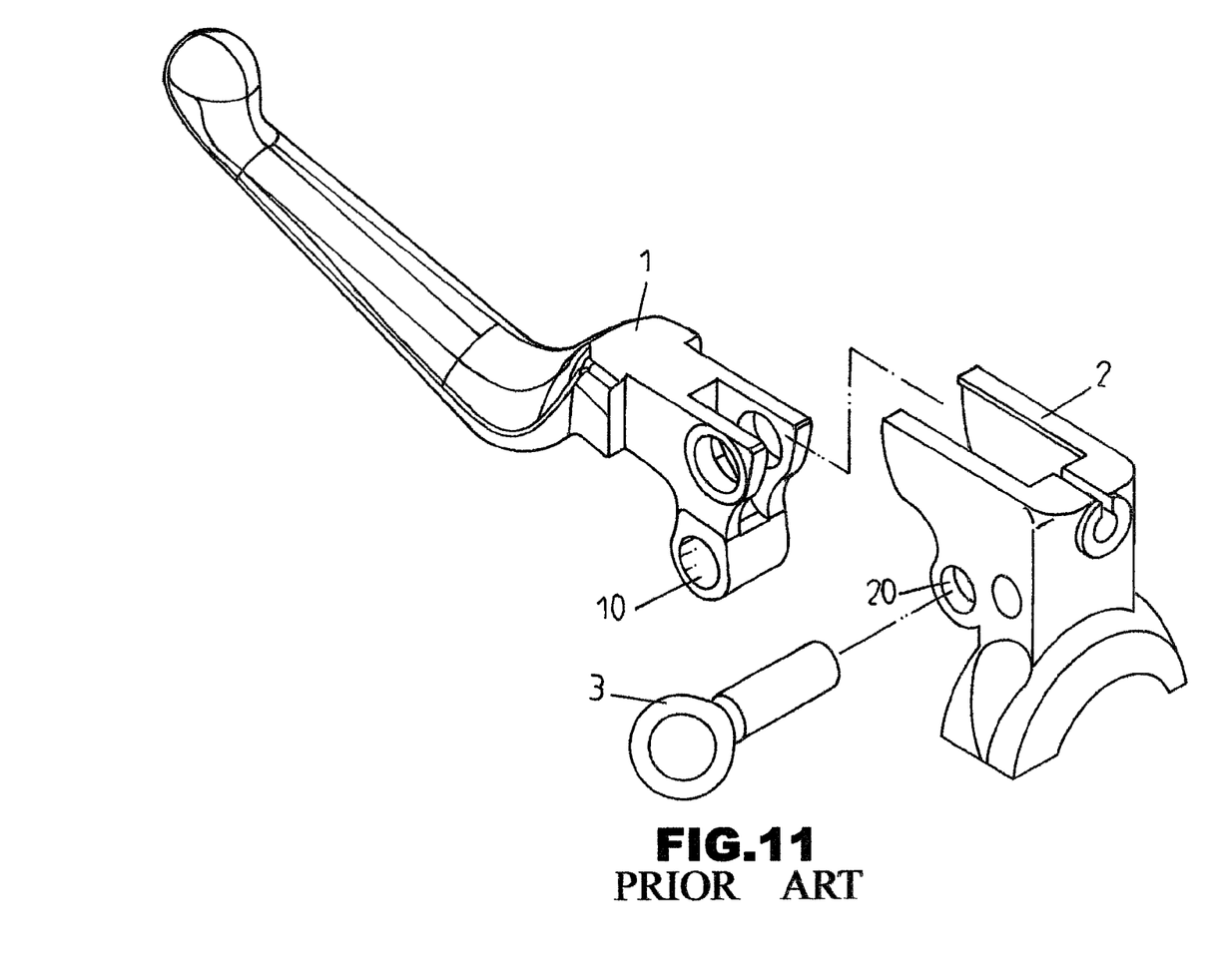
FIG. 11 is an exploded perspective view of a conventional theftproof clutch handle for a motorcycle in accordance with the prior art.

A conventional theftproof clutch handle for a motorcycle in accordance with the prior art shown in FIG. 11 comprises a clutch connector 2 having a through hole 20, a handle body 1 removably mounted on the clutch connector 2 and having a through bore 10, and a fastening pin 3 extending through the through hole 20 of the clutch connector 2 and the through bore 10 of the handle body 1 to attach the handle body 1 to the clutch connector 2. Thus, when the fastening pin 3 is detached from the through hole 20 of the clutch connector 2 and the through bore 10 of the handle body 1, the handle body 1 can be removed from the clutch connector 2 so as to provide a theftproof effect. However, the fastening pin 3 is exposed outwardly from the clutch connector 2, thereby greatly decreasing the outer appearance of the theftproof clutch handle. In addition, the handle body 1 cannot be mounted on the clutch connector 2 when the fastening pin 3 is missed.

BRIEF SUMMARY OF THE INVENTION

In accordance with the present invention, there is provided a theftproof clutch handle, comprising a clutch connector provided with a plug, a handle body removably mounted on the clutch connector and provided with a slot detachably mounted on the plug of the clutch connector, and a locking device mounted on the handle body and releasably locked onto the plug of the clutch connector to releasably lock the plug of the clutch connector in the slot of the handle body and to releasably lock the handle body onto the clutch connector. The plug of the clutch connector is provided with a locking hole. The handle body has an inner portion provided with a receiving chamber connected to the slot of the handle body to receive the locking device. The locking device includes a support seat secured in the receiving chamber of the handle body, a locking shaft movably mounted in the support seat and having a first end detachably locked in the locking hole of the plug, an elastic member mounted on the locking shaft and biased between the support seat and a second end of the locking shaft to push the locking shaft toward the locking hole of the plug, and a drive member movably mounted on the support seat and having a first end connected with the locking shaft to drive and move the locking shaft relative to the plug of the clutch connector and a second end provided with a pull ring.

The primary objective of the present invention is to provide a theftproof clutch handle that is detached easily and quickly.

Another objective of the present invention is to provide a theftproof clutch handle for a motorcycle, wherein when the drive member of the locking device is pulled outwardly, the locking shaft of the locking device is moved outwardly to detach from the locking hole of the plug to unlock the handle body from the clutch connector so that the slot of the handle body can be detached from the plug of the clutch connector, and the handle body can be removed from the clutch connector to provide a theftproof effect.

A further objective of the present invention is to provide a theftproof clutch handle for a motorcycle, wherein a user only needs to pull the pull ring of the drive member to remove the handle body from the clutch connector so that the handle body can be removed from the clutch connector easily and quickly, thereby facilitating the user detaching the theftproof clutch handle.

A further objective of the present invention is to provide a theftproof clutch handle for a motorcycle, wherein the locking device is hidden in the receiving chamber of the handle body and encompassed between the handle body and the clutch connector, so that the locking device will not be exposed outwardly from the handle body and the clutch connector, thereby enhancing the aesthetic quality of the theftproof clutch handle.

Further benefits and advantages of the present invention will become apparent after a careful reading of the detailed description with appropriate reference to the accompanying drawings.

DETAILED DESCRIPTION OF THE INVENTION

Referring to the drawings and initially to FIGS. 1-6, a theftproof clutch handle for a motorcycle in accordance with the preferred embodiment of the present invention comprises a clutch connector 5 provided with a plug 51, a handle body 4 removably mounted on the clutch connector 5 and provided with a slot 41 detachably mounted on the plug 51 of the clutch connector 5, and a locking device 43 mounted on the handle body 4 and releasably locked onto the plug 51 of the clutch connector 5 to releasably lock the plug 51 of the clutch connector 5 in the slot 41 of the handle body 4 and to releasably lock the handle body 4 onto the clutch connector 5.

The plug 51 of the clutch connector 5 is provided with a locking hole 52. The locking hole 52 of the plug 51 is perpendicular to the plug 51 of the clutch connector 5.

The handle body 4 has an inner portion provided with a receiving chamber 42 connected to the slot 41 of the handle body 4 to receive the locking device 43. The receiving chamber 42 of the handle body 4 is perpendicular to the slot 41 of the handle body 4. The handle body 4 has an end face provided with a through hole 44 connected to the receiving chamber 42 of the handle body 4.

The locking device 43 is hidden in the receiving chamber 42 of the handle body 4 and encompassed between the handle body 4 and the clutch connector 5. The locking device 43 includes a support seat 432 secured in the receiving chamber 42 of the handle body 4, a locking shaft 434 movably mounted in the support seat 432 and having a first end detachably locked in the locking hole 52 of the plug 51, an elastic member 431 mounted on the locking shaft 434 and biased between the support seat 432 and a second end of the locking shaft 434 to push the locking shaft 434 toward the locking hole 52 of the plug 51, a fixing pin 435 extending through the handle body 4 and the support seat 432 to secure the support seat 432 in the receiving chamber 42 of the handle body 4, and a drive member 430 movably mounted on the support seat 432 and having a first end connected with the locking shaft 434 to drive and move the locking shaft 434 relative to the plug 51 of the clutch connector 5 and a second end provided with a pull ring 4301.

The locking device 43 further includes a connecting rod 433 extending through the drive member 430 and the locking shaft 434 to connect the drive member 430 and the locking shaft 434 so that the locking shaft 434 is movable in concert with the drive member 430.

The support seat 432 of the locking device 43 has a substantially L-shaped cross-sectional profile. The support seat 432 of the locking device 43 has an inner portion provided with a receiving recess 4322 (see FIG. 3) to receive the locking shaft 434 and the elastic member 431. The support seat 432 of the locking device 43 has a bottom having a size flush with that of the receiving chamber 42 of the handle body 4 to seal the receiving chamber 42 of the handle body 4. The bottom of the support seat 432 is provided with a passage 4321. The support seat 432 of the locking device 43 has a side provided with a through bore 4323 aligning with the through hole 44 of the handle body 4.

Figure 3:
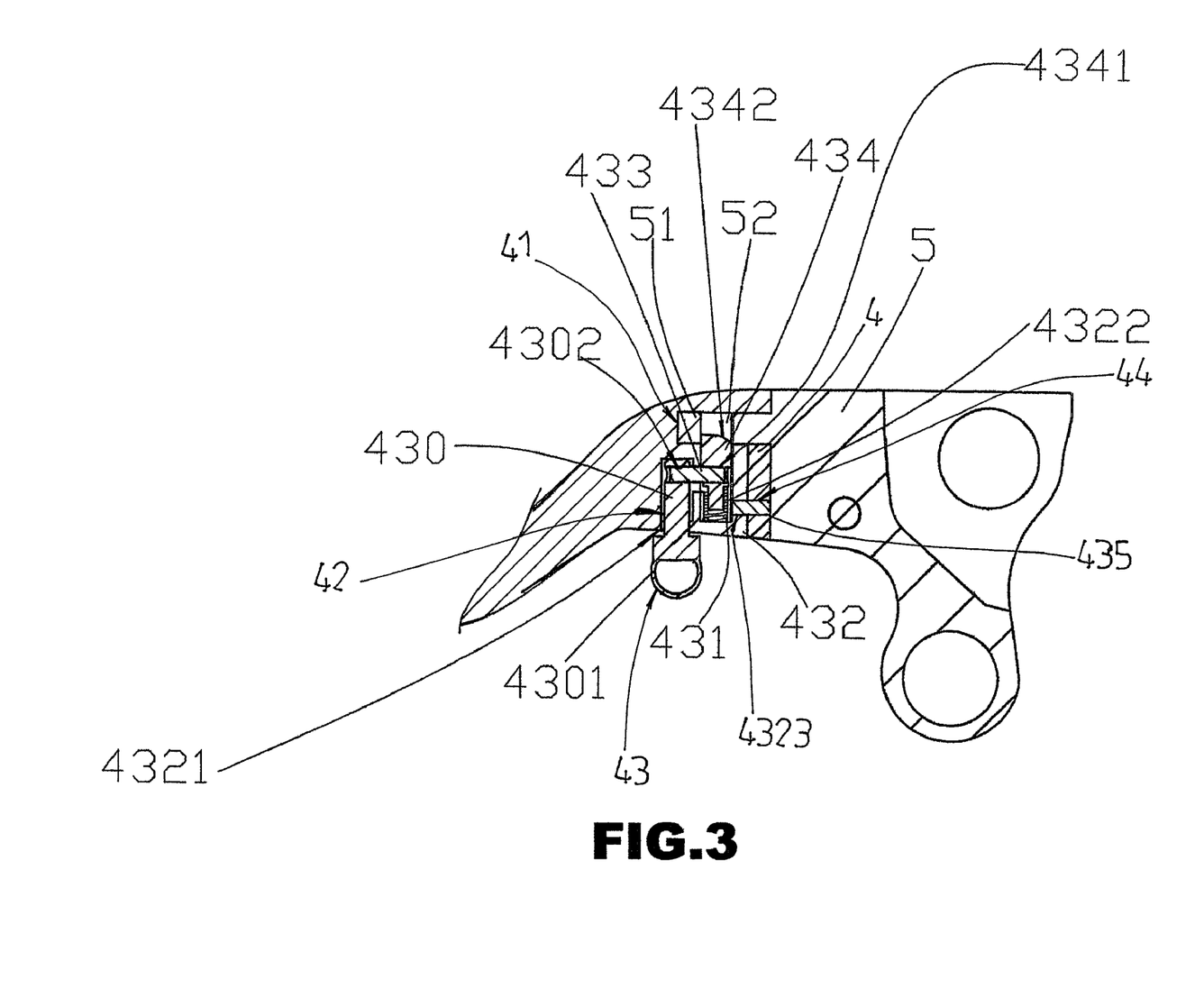
FIG. 3 is a cross-sectional view of the theftproof clutch handle taken along line 3-3 as shown in FIG. 1.

The fixing pin 435 of the locking device 43 in turn extends through the through hole 44 of the handle body 4 and the through bore 4323 of the support seat 432 to lock the support seat 432 of the locking device 43 on the handle body 4.

The locking shaft 434 is movable in the receiving recess 4322 of the support seat 432. The locking shaft 434 of the locking device 43 has a mediate portion provided with a fixing hole 4341. The first end of the locking shaft 434 is provided with a guide ramp 4342 abutting a bottom of the plug 51 of the clutch connector 5 to facilitate insertion of the locking shaft 434 into the locking hole 52 of the plug 51 when the slot 41 of the handle body 4 is movable relative to the plug 51 of the clutch connector 5. The second end of the locking shaft 434 is mounted in the elastic member 431.

The drive member 430 of the locking device 43 extends through and is movable in the passage 4321 of the support seat 432. The first end of the drive member 430 is movable in the receiving chamber 42 of the handle body 4 and is provided with a fixing bore 4302 aligning with the fixing hole 4341 of the locking shaft 434. The pull ring 4301 of the drive member 430 protrudes outwardly from the support seat 432 of the locking device 43 to facilitate a user pulling the drive member 430.

The connecting rod 433 of the locking device 43 extends through the fixing hole 4341 of the locking shaft 434 and the fixing bore 4302 of the drive member 430.

Figure 6:
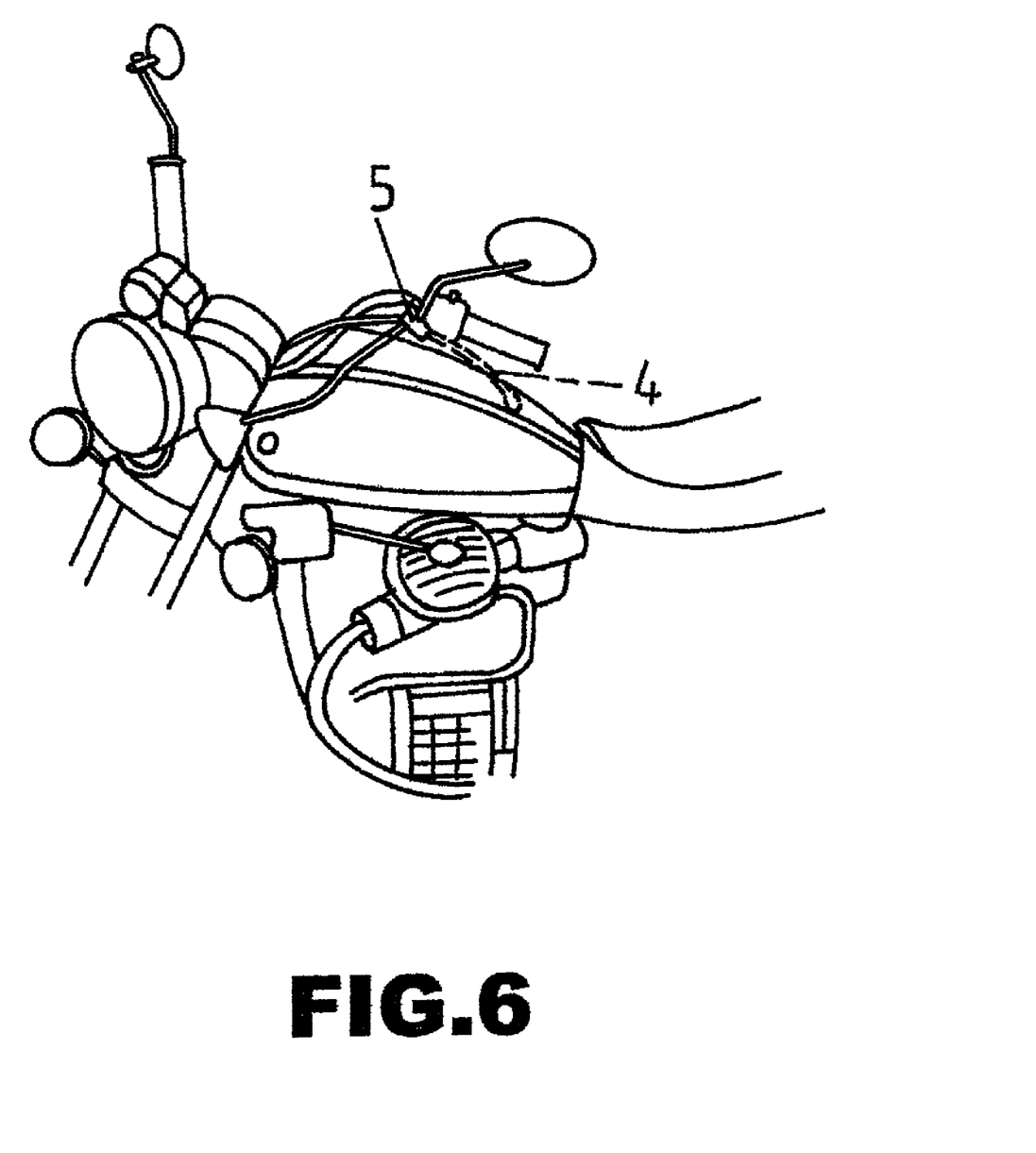
FIG. 6 is a perspective view of the theftproof clutch handle for a motorcycle in accordance with the preferred embodiment of the present invention.

As shown in FIG. 6, the clutch connector 5 of the theftproof clutch handle is mounted on a motorcycle, and the handle body 4 is combined with the clutch connector 5 so that the theftproof clutch handle can be operated by a user.

Figure 1:
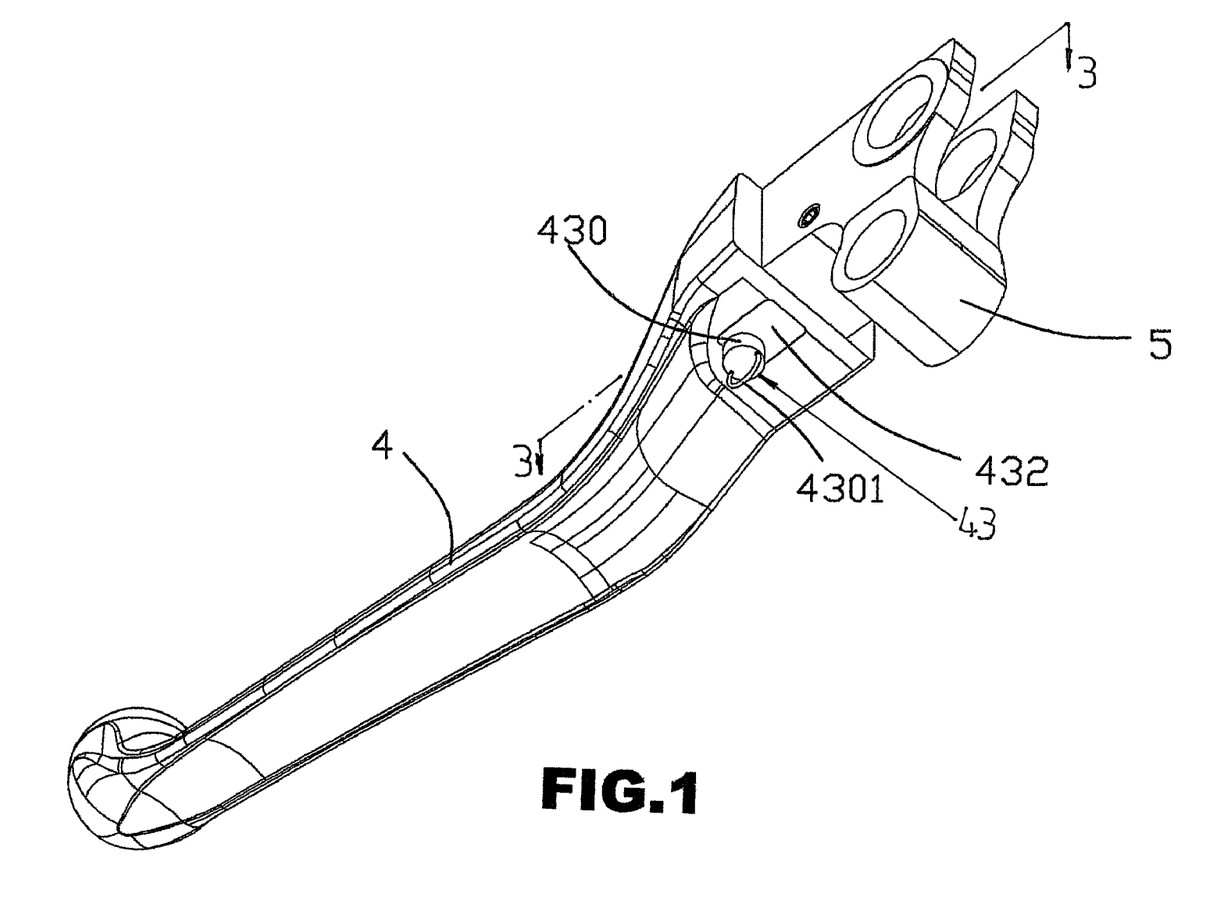
FIG. 1 is a perspective view of a theftproof clutch handle in accordance with the preferred embodiment of the present invention.
Figure 2:
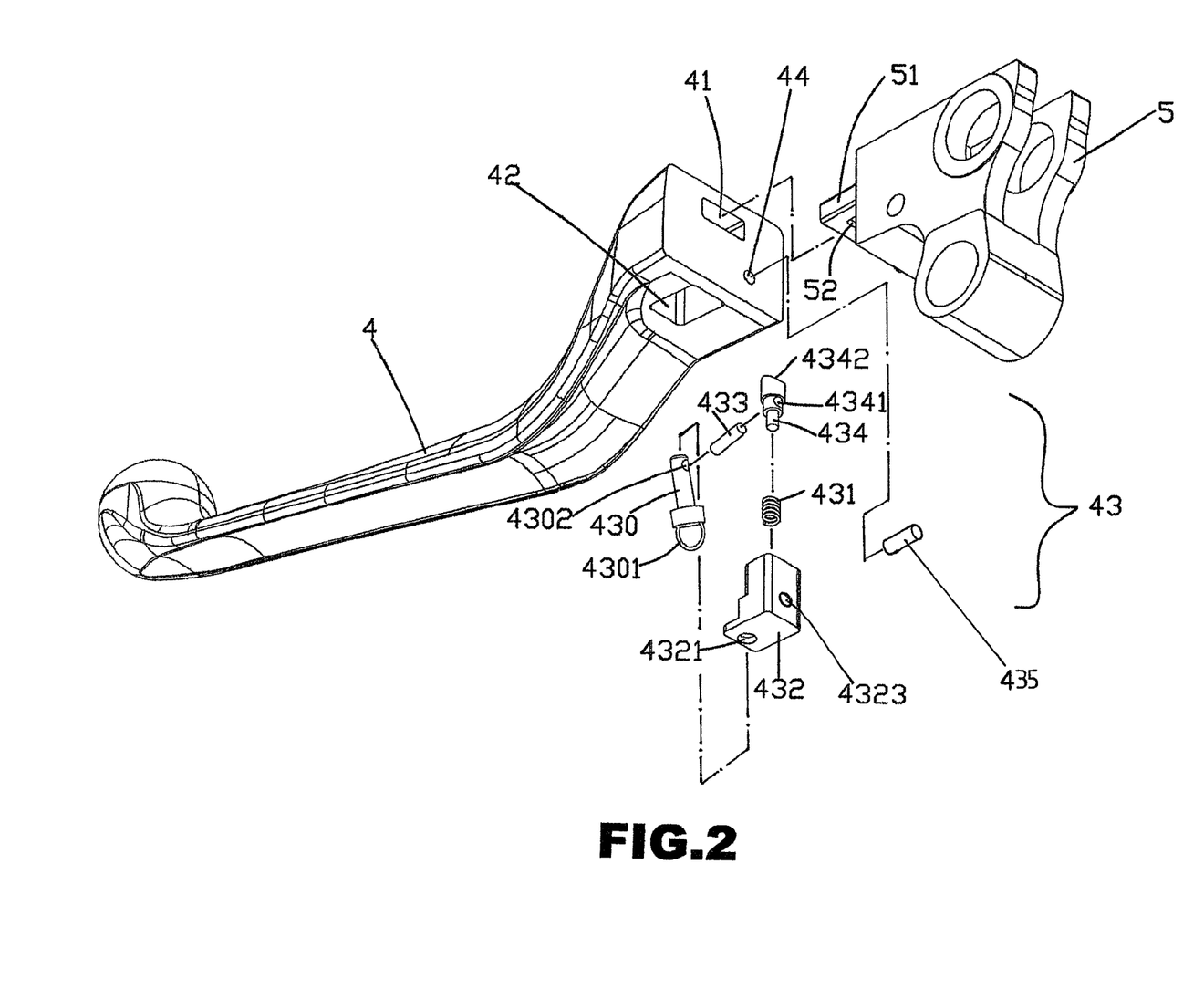
FIG. 2 is an exploded perspective view of the theftproof clutch handle as shown in FIG. 1.
Figure 4:
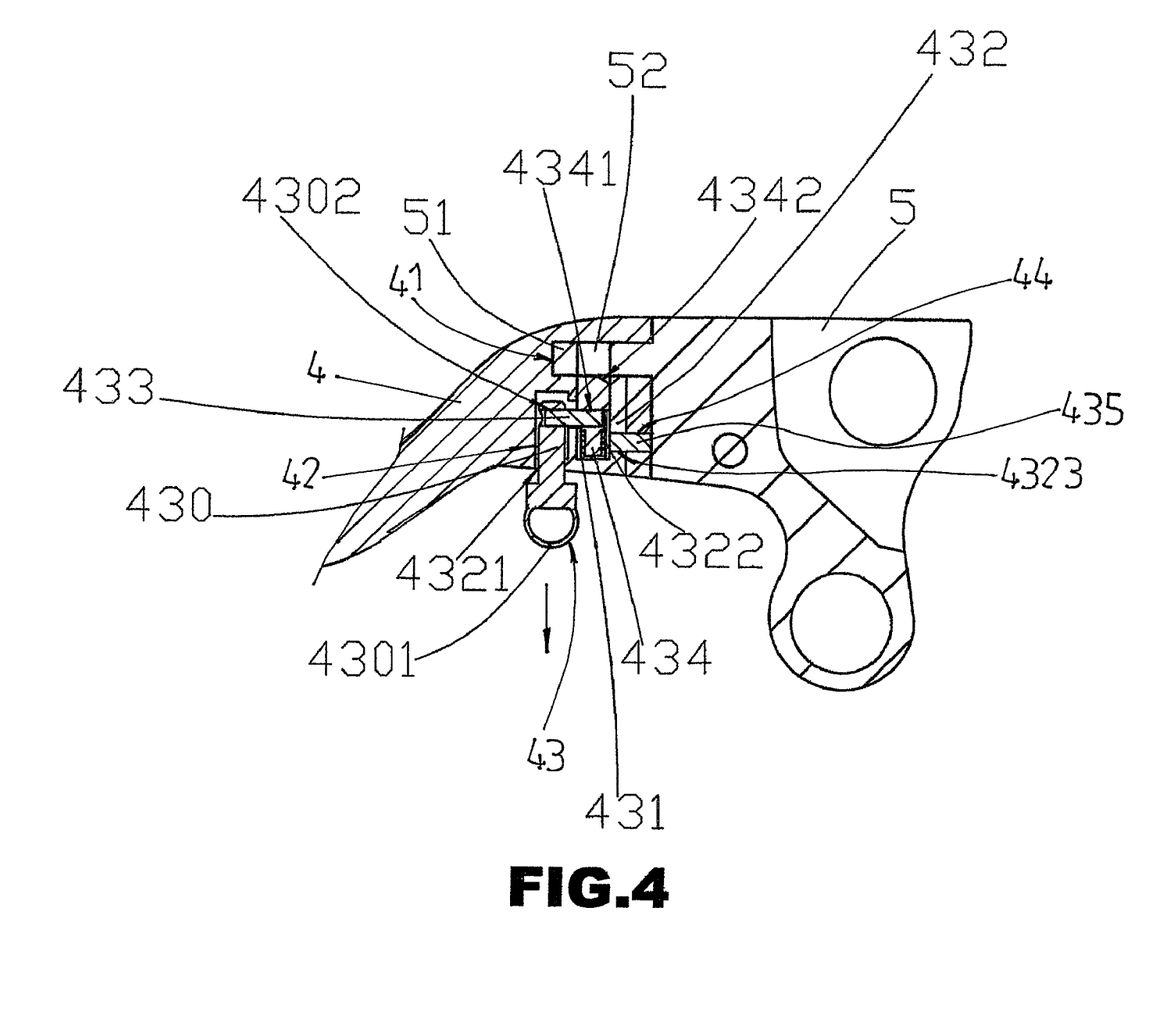
FIG. 4 is a schematic operation view of the theftproof clutch handle as shown in FIG. 3.
Figure 5:
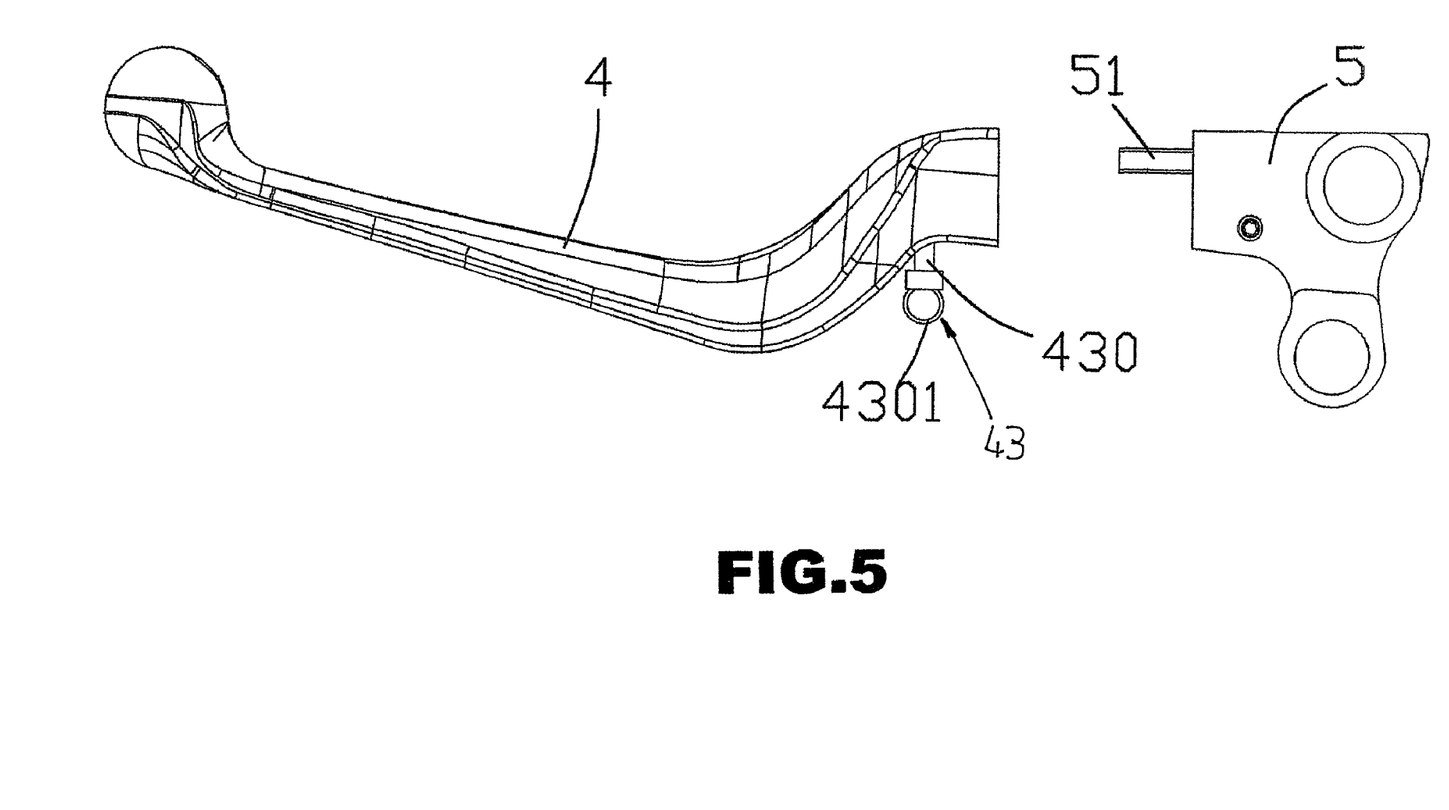
FIG. 5 is an exploded view of the theftproof clutch handle as shown in FIG. 3.

In operation, referring to FIGS. 3-5 with reference to FIGS. 1 and 2, when the slot 41 of the handle body 4 is mounted on the plug 51 of the clutch connector 5, the plug 51 of the clutch connector 5 is moved in the slot 41 of the handle body 4 to press the guide ramp 4342 of the locking shaft 434 downward and to compress the elastic member 431 so that the locking shaft 434 is located beneath the plug 51 of the clutch connector 5. In such a manner, when the locking shaft 434 of the locking device 43 aligns with the locking hole 52 of the plug 51, the locking shaft 434 of the locking device 43 is pushed toward the locking hole 52 of the plug 51 by the restoring force of the elastic member 431, so that the locking shaft 434 of the locking device 43 is locked in the locking hole 52 of the plug 51 as shown in FIG. 3 to lock the handle body 4 onto the clutch connector 5 as shown in FIG. 1. On the contrary, when the drive member 430 of the locking device 43 is pulled outwardly relative to the plug 51 of the clutch connector 5, the locking shaft 434 of the locking device 43 is moved outwardly relative to the plug 51 of the clutch connector 5 to compress the elastic member 431, so that the locking shaft 434 of the locking device 43 is moved to detach from the locking hole 52 of the plug 51 as shown in FIG. 4 to unlock the handle body 4 from the clutch connector 5. Thus, the slot 41 of the handle body 4 can be detached from the plug 51 of the clutch connector 5, and the handle body 4 can be removed from the clutch connector 5 as shown in FIG. 5 to provide a theftproof effect.

Accordingly, when the drive member 430 of the locking device 43 is pulled outwardly, the locking shaft 434 of the locking device 43 is moved outwardly to detach from the locking hole 52 of the plug 51 to unlock the handle body 4 from the clutch connector 5 so that the slot 41 of the handle body 4 can be detached from the plug 51 of the clutch connector 5, and the handle body 4 can be removed from the clutch connector 5 to provide a theftproof effect. In addition, a user only needs to pull the pull ring 4301 of the drive member 430 to remove the handle body 4 from the clutch connector 5 so that the handle body 4 can be removed from the clutch connector 5 easily and quickly, thereby facilitating the user detaching the theftproof clutch handle. Further, the locking device 43 is hidden in the receiving chamber 42 of the handle body 4 and encompassed between the handle body 4 and the clutch connector 5, so that the locking device 43 will not be exposed outwardly from the handle body 4 and the clutch connector 5, thereby enhancing the aesthetic quality of the theftproof clutch handle.

Referring to FIGS. 7-10, a theftproof clutch handle for a motorcycle in accordance with another preferred embodiment of the present invention comprises a clutch connector 5 provided with a plug 51, a handle body 4 removably mounted on the clutch connector 5 and provided with a slot 41 detachably mounted on the plug 51 of the clutch connector 5, and a locking device 43a mounted on the handle body 4 and releasably locked onto the plug 51 of the clutch connector 5 to releasably lock the plug 51 of the clutch connector 5 in the slot 41 of the handle body 4 and to releasably lock the handle body 4 onto the clutch connector 5.

The plug 51 of the clutch connector 5 is provided with a locking hole 52. The locking hole 52 of the plug 51 is perpendicular to the plug 51 of the clutch connector 5.

The handle body 4 has an inner portion provided with a receiving chamber 42a connected to the slot 41 of the handle body 4 to receive the locking device 43a. The receiving chamber 42a of the handle body 4 is perpendicular to the slot 41 of the handle body 4. The handle body 4 has an end face provided with a through hole 44 connected to the receiving chamber 42a of the handle body 4.

The locking device 43a is hidden in the receiving chamber 42a of the handle body 4 and encompassed between the handle body 4 and the clutch connector 5. The locking device 43a includes a support seat 432a secured in the receiving chamber 42a of the handle body 4, a locking shaft 434a movably mounted in the support seat 432a and having a first end detachably locked in the locking hole 52 of the plug 51, an elastic member 431 mounted on the locking shaft 434a and biased between the support seat 432a and a second end of the locking shaft 434a to push the locking shaft 434a toward the locking hole 52 of the plug 51, a fixing pin 435 extending through the handle body 4 and the support seat 432a to secure the support seat 432a in the receiving chamber 42a of the handle body 4, and a drive member 430a movably mounted on the support seat 432a and having a first end connected with the locking shaft 434a to drive and move the locking shaft 434a relative to the plug 51 of the clutch connector 5 and a second end provided with a pull ring 4301a.

The support seat 432a of the locking device 43a has an inner portion provided with a receiving recess 4322a (see FIG. 9) to receive the locking shaft 434a and the elastic member 431. The support seat 432a of the locking device 43a has a bottom having a size flush with that of the receiving chamber 42a of the handle body 4 to seal the receiving chamber 42a of the handle body 4. The bottom of the support seat 432a is provided with a passage 4321a. The support seat 432a of the locking device 43a has a side provided with a through bore 4323a aligning with the through hole 44 of the handle body 4.

Figure 9:
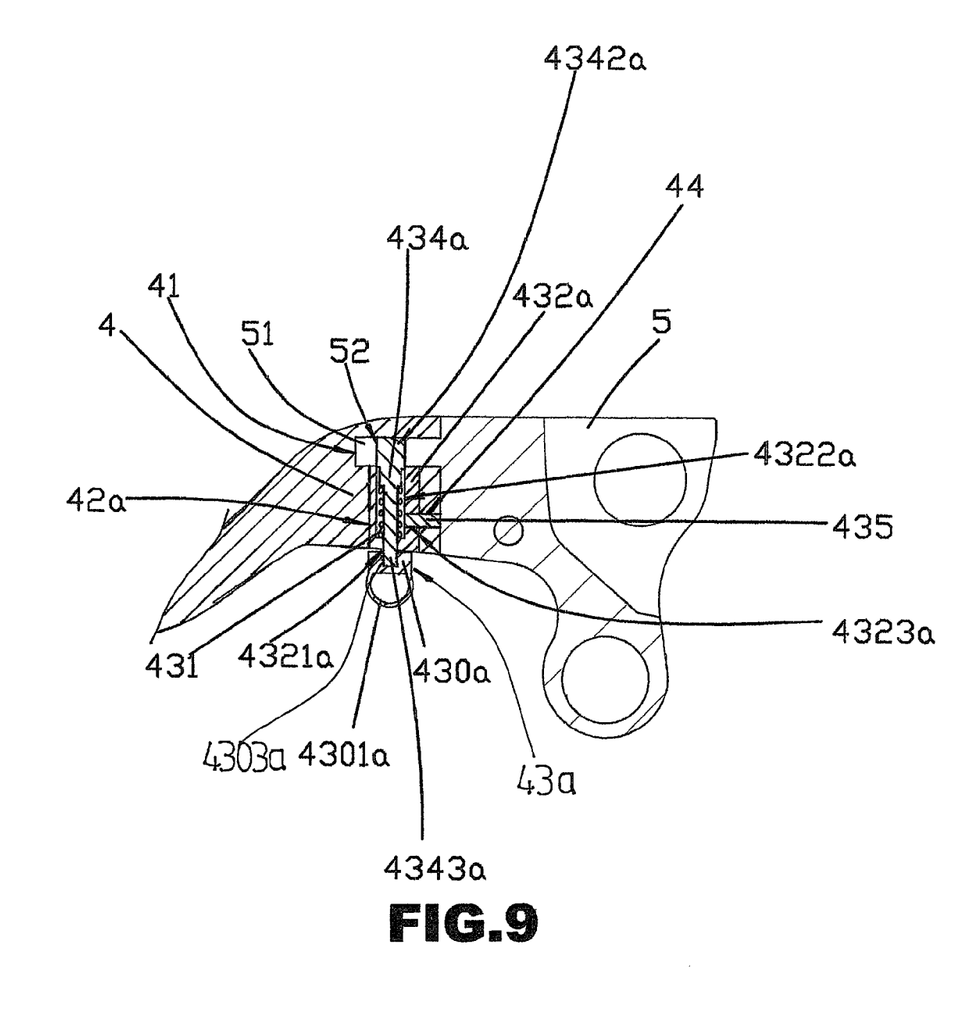
FIG. 9 is a cross-sectional view of the theftproof clutch handle taken along line 9-9 as shown in FIG. 7.

The fixing pin 435 of the locking device 43a in turn extends through the through hole 44 of the handle body 4 and the through bore 4323a of the support seat 432a to lock the support seat 432a of the locking device 43a on the handle body 4.

The locking shaft 434a is movable in the receiving recess 4322a of the support seat 432a. The first end of the locking shaft 434a is provided with a guide ramp 4342a abutting a bottom of the plug 51 of the clutch connector 5 to facilitate insertion of the locking shaft 434a into the locking hole 52 of the plug 51 when the slot 41 of the handle body 4 is movable relative to the plug 51 of the clutch connector 5. The second end of the locking shaft 434a is provided with an outer thread 4343a extending through the elastic member 431 and the passage 4321a of the support seat 432a and protruding outwardly from the passage 4321a of the support seat 432.

The first end of the drive member 430a is provided with an inner thread 4303a screwed onto the outer thread 4343a of the locking shaft 434a. The pull ring 4301a of the drive member 430a protrudes outwardly from the support seat 432a of the locking device 43a to facilitate a user pulling the drive member 430a.

Figure 7:
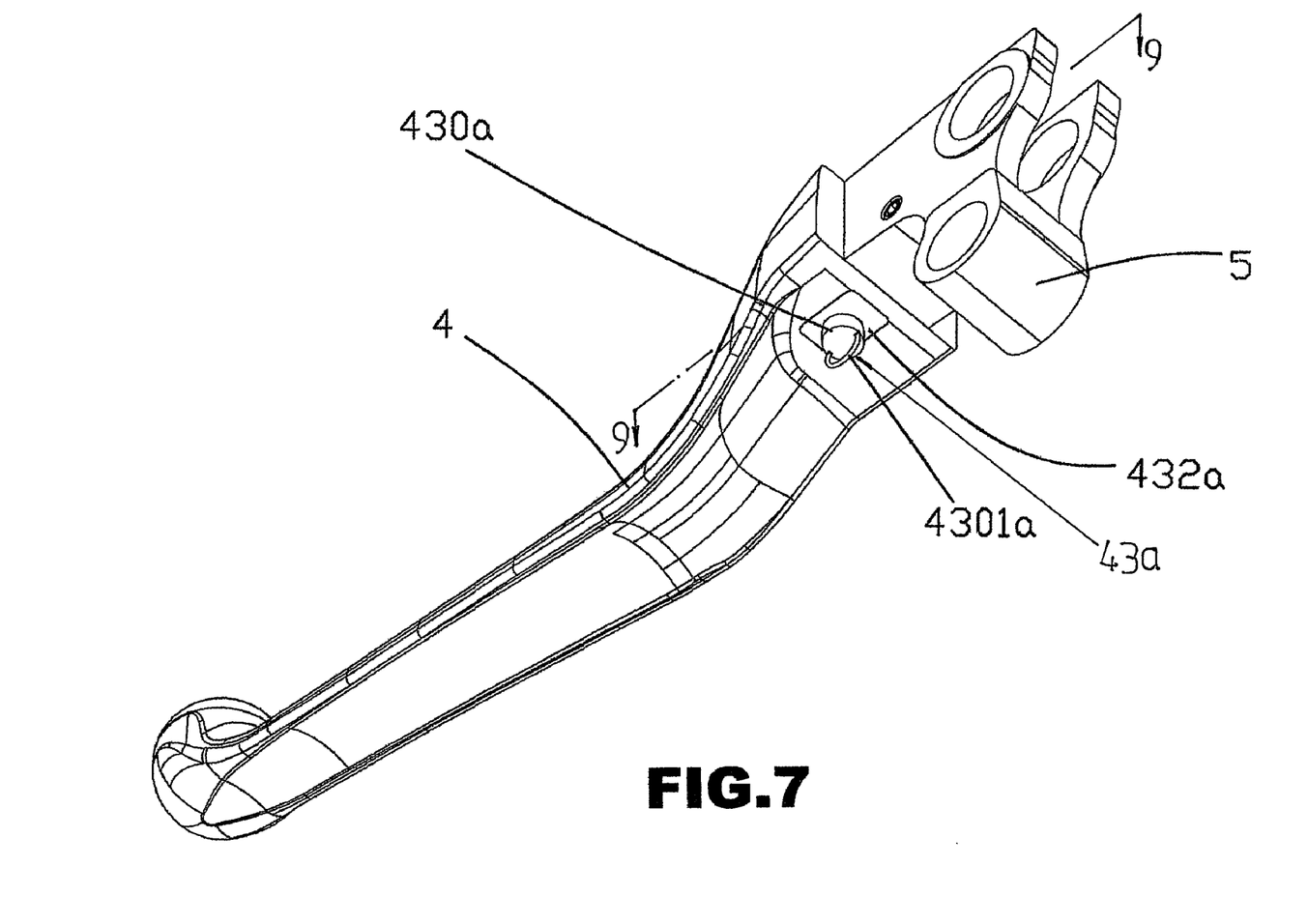
FIG. 7 is a perspective view of a theftproof clutch handle in accordance with another preferred embodiment of the present invention.
Figure 8:
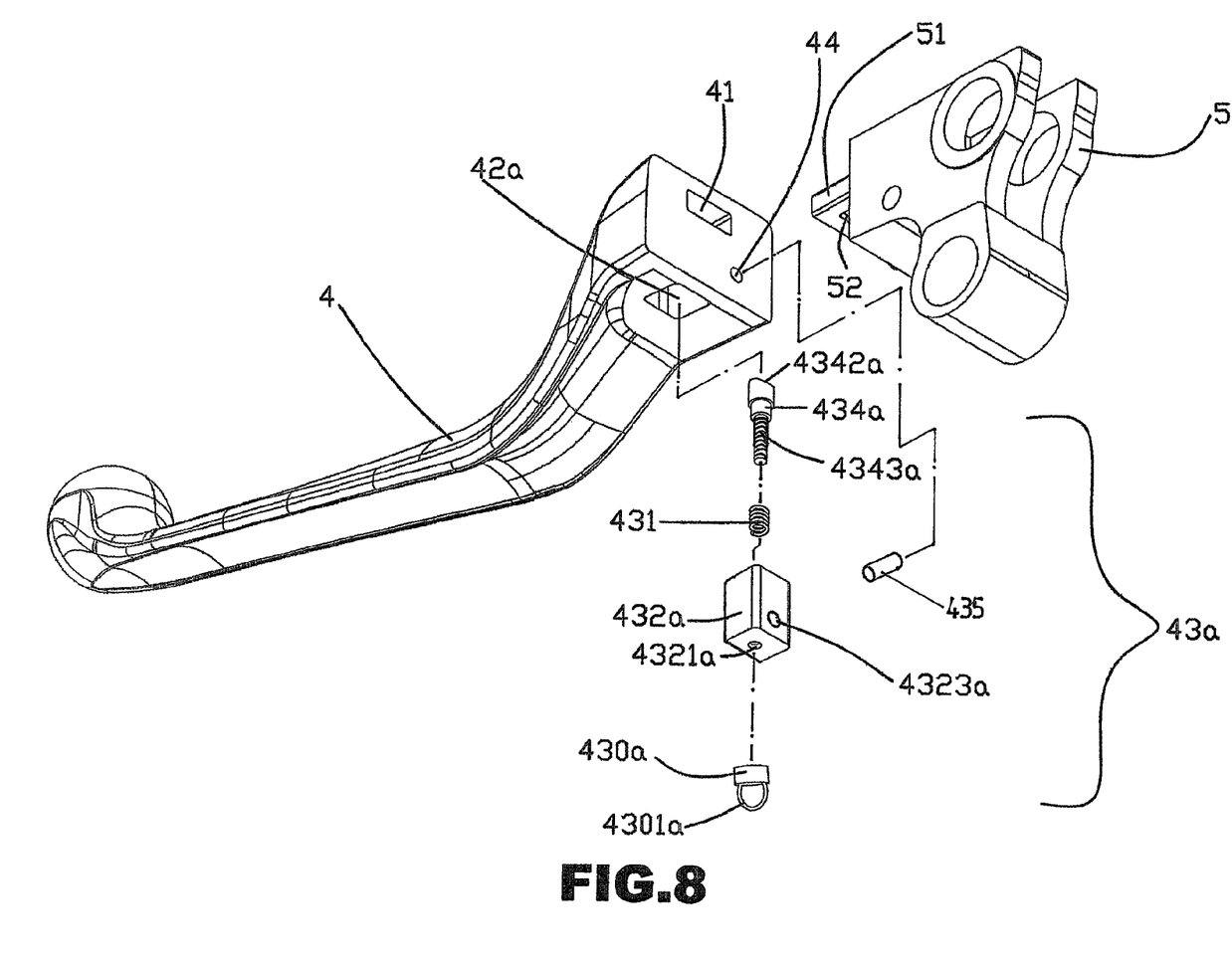
FIG. 8 is an exploded perspective view of the theftproof clutch handle as shown in FIG. 7.
Figure 10:
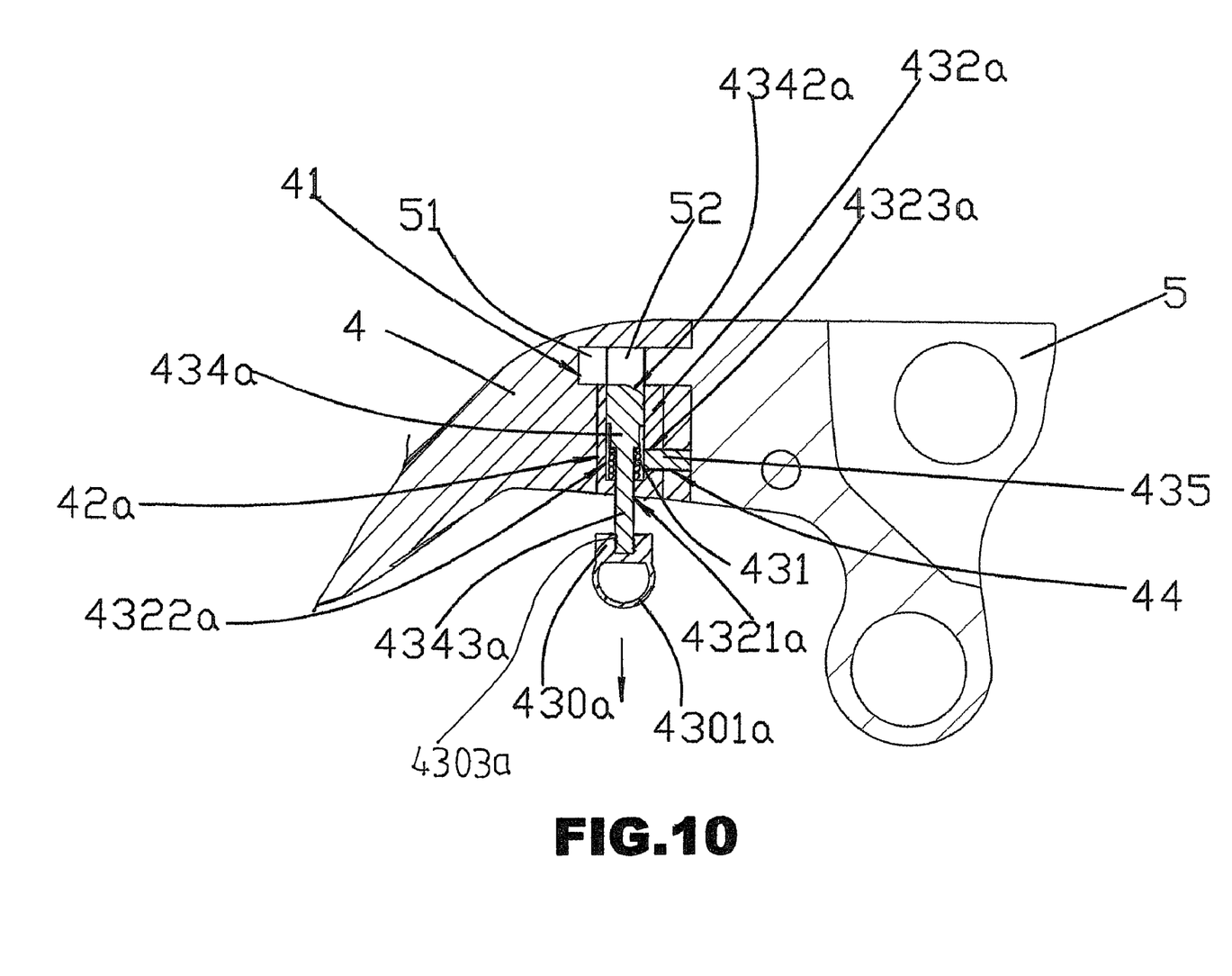
FIG. 10 is a schematic operation view of the theftproof clutch handle as shown in FIG. 9.

In operation, when the slot 41 of the handle body 4 is mounted on the plug 51 of the clutch connector 5, the plug 51 of the clutch connector 5 is moved in the slot 41 of the handle body 4 to press the guide ramp 4342a of the locking shaft 434a downward and to compress the elastic member 431 so that the locking shaft 434a is located beneath the plug 51 of the clutch connector 5. In such a manner, when the locking shaft 434a of the locking device 43a aligns with the locking hole 52 of the plug 51, the locking shaft 434a of the locking device 43a is pushed toward the locking hole 52 of the plug 51 by the restoring force of the elastic member 431, so that the locking shaft 434a of the locking device 43a is locked in the locking hole 52 of the plug 51 as shown in FIG. 9 to lock the handle body 4 onto the clutch connector 5 as shown in FIG. 7. On the contrary, when the drive member 430a of the locking device 43a is pulled outwardly relative to the plug 51 of the clutch connector 5, the locking shaft 434a of the locking device 43a is moved outwardly relative to the plug 51 of the clutch connector 5 to compress the elastic member 431, so that the locking shaft 434a of the locking device 43a is moved to detach from the locking hole 52 of the plug 51 as shown in FIG. 10 to unlock the handle body 4 from the clutch connector 5. Thus, the slot 41 of the handle body 4 can be detached from the plug 51 of the clutch connector 5, and the handle body 4 can be removed from the clutch connector 5 to provide a theftproof effect.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

The invention claimed is:
1. A theftproof clutch handle comprising:
a clutch connector provided with a plug;
a handle body removably mounted on the clutch connector and provided with a slot detachably mounted on the plug of the clutch connector; and
a locking device mounted on the handle body and releasably locked onto the plug of the clutch connector to releasably lock the plug of the clutch connector in the slot of the handle body and to releasably lock the handle body onto the clutch connector, wherein
the plug of the clutch connector is provided with a locking hole;
the handle body has an inner portion provided with a receiving chamber connected to the slot of the handle body to receive the locking device; and
the locking device includes:
a support seat secured in the receiving chamber of the handle body;
a locking shaft movably mounted in the support seat and having a first end detachably locked in the locking hole of the plug;
an elastic member mounted on the locking shaft and biased between the support seat and a second end of the locking shaft to push the locking shaft toward the locking hole of the plug; and
a drive member movably mounted on the support seat and having a first end connected with the locking shaft to drive and move the locking shaft relative to the plug of the clutch connector and a second end provided with a pull ring.

2. The theftproof clutch handle of claim 1, wherein the locking device further includes:
a fixing pin extending through the handle body and the support seat to secure the support seat in the receiving chamber of the handle body.

3. The theftproof clutch handle of claim 2, wherein
the handle body has an end face provided with a through hole connected to the receiving chamber of the handle body;
the support seat of the locking device has a side provided with a through bore aligning with the through hole of the handle body; and
the fixing pin of the locking device in turn extends through the through hole of the handle body and the through bore of the support seat to lock the support seat of the locking device on the handle body.

4. The theftproof clutch handle of claim 2, wherein the locking device further includes:
a connecting rod extending through the drive member and the locking shaft to connect the drive member and the locking shaft so that the locking shaft is movable in concert with the drive member.

5. The theftproof clutch handle of claim 4, wherein
the locking shaft of the locking device has a mediate portion provided with a fixing hole;
the first end of the drive member is provided with a fixing bore aligning with the fixing hole of the locking shaft; and
the connecting rod of the locking device extends through the fixing hole of the locking shaft and the fixing bore of the drive member.

6. The theftproof clutch handle of claim 1, wherein
the support seat of the locking device has an inner portion provided with a receiving recess to receive the locking shaft and the elastic member; and
the locking shaft is movable in the receiving recess of the support seat.

7. The theftproof clutch handle of claim 1, wherein the first end of the locking shaft is provided with a guide ramp abutting a bottom of the plug of the clutch connector to facilitate insertion of the locking shaft into the locking hole of the plug when the slot of the handle body is movable relative to the plug of the clutch connector.

8. The theftproof clutch handle of claim 1, wherein the pull ring of the drive member protrudes outwardly from the support seat of the locking device to facilitate a user pulling the drive member.

9. The theftproof clutch handle of claim 1, wherein
the support seat of the locking device has a bottom having a size flush with the receiving chamber of the handle body to seal the receiving chamber of the handle body; and
the bottom of the support seat is provided with a passage.

10. The theftproof clutch handle of claim 9, wherein
the drive member of the locking device extends through and is movable in the passage of the support seat; and
the first end of the drive member is movable in the receiving chamber of the handle body.

11. The theftproof clutch handle of claim 9, wherein
the second end of the locking shaft is provided with an outer thread extending through the elastic member and the passage of the support seat and protruding outwardly from the passage of the support seat; and
the first end of the drive member is provided with an inner thread screwed onto the outer thread of the locking shaft.

12. The theftproof clutch handle of claim 1, wherein the locking hole of the plug is perpendicular to the plug of the clutch connector.

13. The theftproof clutch handle of claim 1, wherein the receiving chamber of the handle body is perpendicular to the slot of the handle body.

14. The theftproof clutch handle of claim 1, wherein the locking device is hidden in the receiving chamber of the handle body and encompassed between the handle body and the clutch connector.

15. The theftproof clutch handle of claim 1, wherein the second end of the locking shaft is mounted in the elastic member.

* * * * *